April 12, 1949.   C. T. GERMANN   2,467,124
ELECTRONIC POINT INSPECTION
Filed May 21, 1946   2 Sheets-Sheet 2
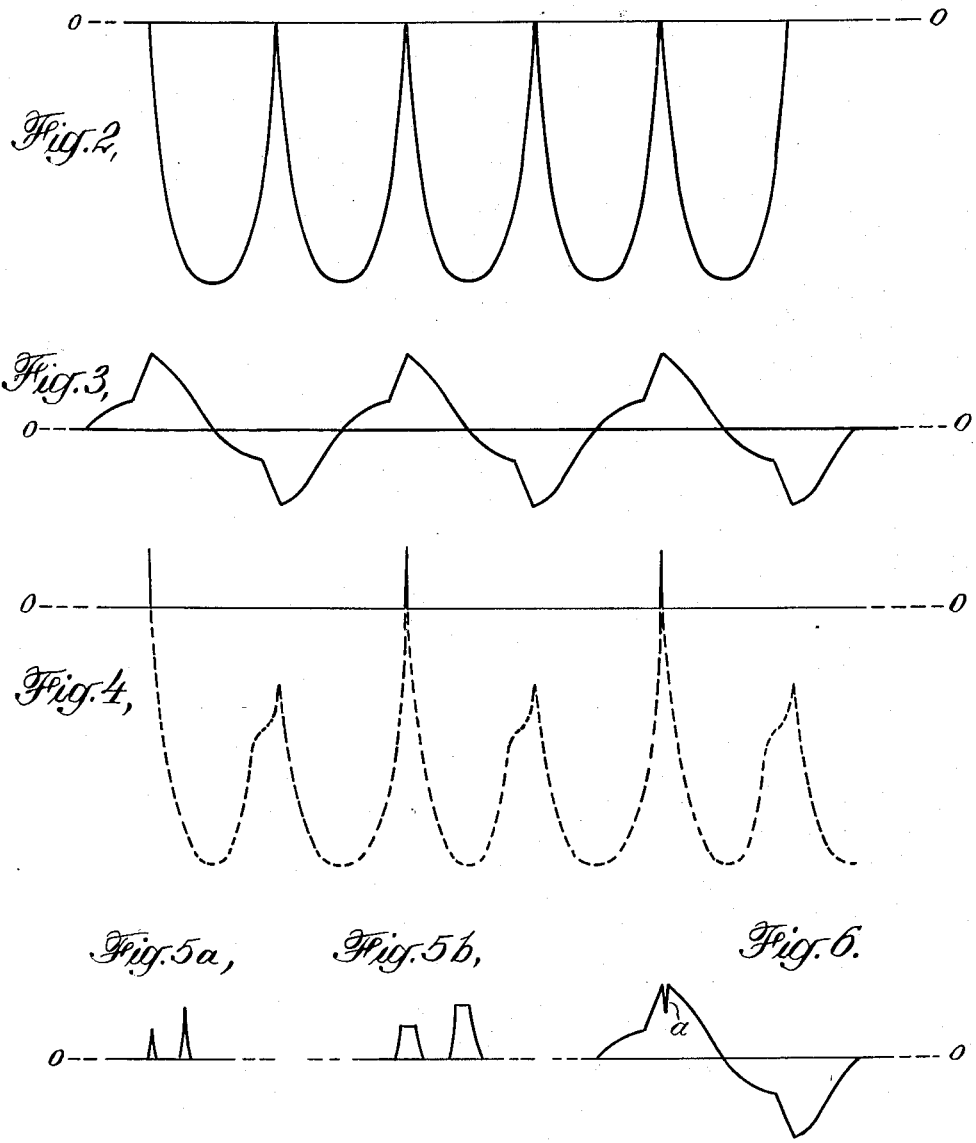
INVENTOR
CHARLES T. GERMANN
BY
Pennie, Edmonds, Morton & Barrows
ATTORNEYS Patented Apr. 12, 1949

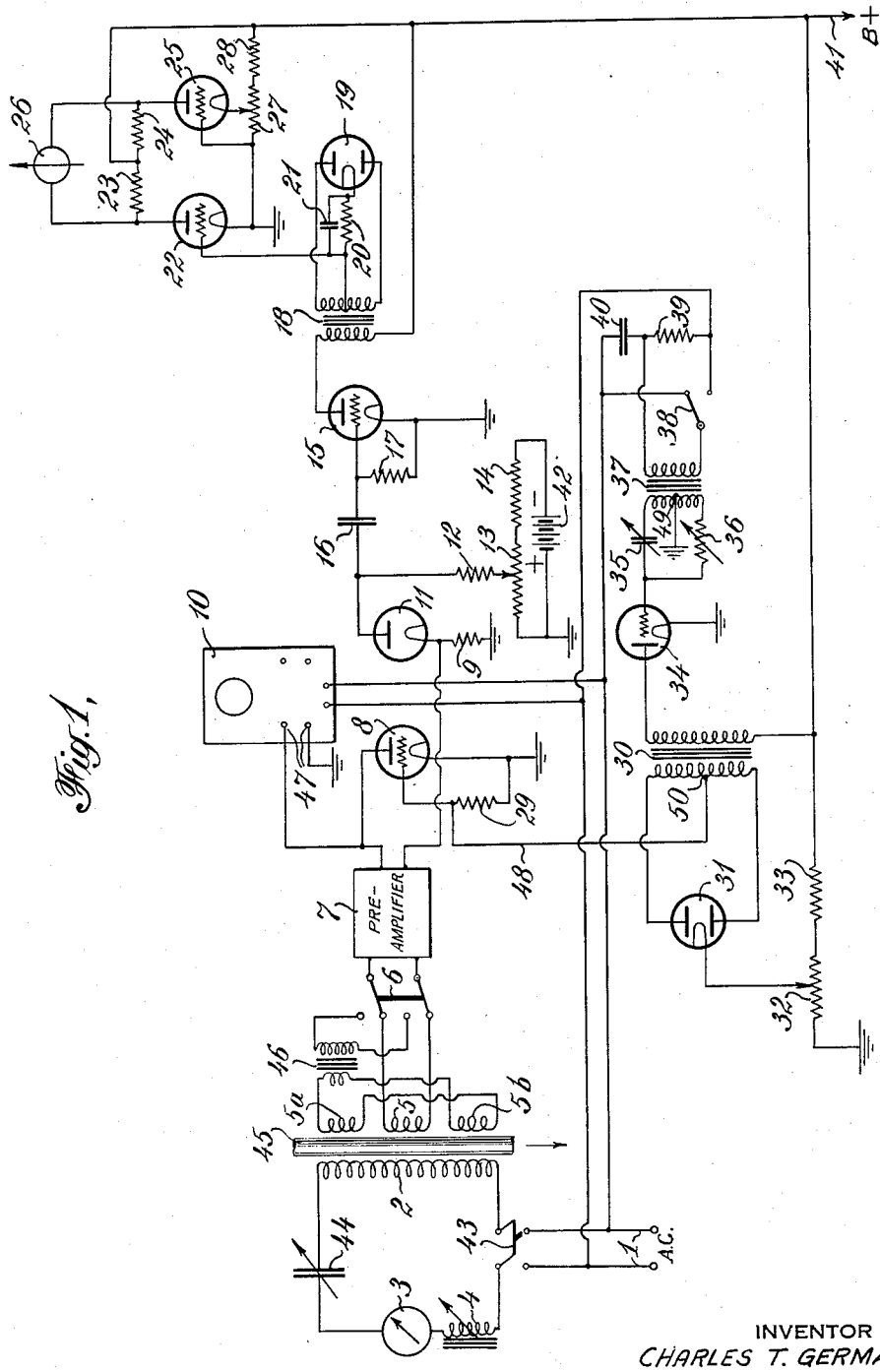

2,467,124

UNITED STATES PATENT OFFICE 2,467,124

ELECTRONIC POINT INSPECTION

Charles T. Germann, Clifton, N. J., assignor to Magnetic Analysis Corporation, Long Island City, N. Y., a corporation of New York Application May 21, 1946, Serial No. 671,352

5 Claims. (Cl. 175—183)

This invention relates to the non-destructive testing of magnetizable materials, and especially to the magnetic analysis of such materials by investigation of the instantaneous values which occur at preselected phase points of an alternating current wave. Magnetic analysis by such method has been referred to as point inspection, and a method and apparatus suitable therefor are described in U. S. Letters Patent No. 2,144,476, granted January 17, 1939, to Theodor Zuschlag.

The present invention comprises a considerable improvement over that of the mentioned patent, especially in that it provides a more detailed and accurate measurement and indication of the portion of the wave form selected, and also greater latitude and facility in selecting the portion of wave form to be observed or measured.

Metallurgical or other properties or defects of magnetic materials may be determined and measured by subjecting the material to a magnetic field produced by an alternating current and inducing into an electric circuit a signal voltage having a wave form which is characteristic of the condition of the material. According to the mentioned Zuschlag patent the flow of current in this circuit is prevented except during very brief intervals corresponding to the same phase of successive cycles of the signal voltage. In this manner the desired phase or point in the signal current wave is preselected, and the current thus resulting may be measured as an indication of the property, characteristic or defect of the body or material being inspected or tested.

In accordance with the present invention the wave form of the signal voltage may be inspected in its entirety and may be compared with the point or portion of the wave selected for particular investigation. Provision is also made for measuring the magnitude of the voltage comprising the selected portion of the signal wave. By a convenient adjustment any desired point or phase of the signal wave may be selected for inspection and measurement, and by virtue of a novel electronic circuit a very sharp cut-off is provided so as to insure that only the exact portion of the wave desired will be reproduced or measured.

A more complete understanding of the invention may be had by consideration of the following description taken together with the drawings, in which:

Fig. 1 is a circuit diagram of the system of my invention;

Fig. 2 is a representation of an alternating-current wave of the type employed in connection with the invention;

Fig. 3 is an illustration of a type of signal wave which might occur in the use of the invention;

Fig. 4 represents a combination of the alternating-current wave of Fig. 2 and signal wave of Fig. 3, illustrating the effect of the cut-off and other features of the invention;

Figs. 5a and 5b represent typical peak voltage waves of two different widths such as may be attained in the system of the invention; and Fig. 6 represents a signal voltage wave similar to that of Fig. 3 together with a peak wave such as that of Fig. 5a, simultaneously reproduced.

Referring to Fig. 1, a suitable source 1, of alternating current, preferably of substantially pure sinusoidal form, furnishes through the switch 43 current to an energizing circuit comprising energizing coil 2, tuning condenser 44, ammeter 3 and variable reactance 4. The value of current in the energizing coil 2 may be controlled by adjustment of reactance 4, and if additional current is required the circuit may be tuned by adjusting condenser 44 to a value which approaches resonance at the frequency of the alternating current source (here assumed to be 60 cycles per second). The value of condenser 44 will depend on the value of inductance in the circuit; and this condenser may be omitted if high values of energizing current are not desired. It is preferable that coil 2 be formed so that the material or body 45 under test may pass through it, although this is not essential in connection with the invention because it is necessary merely that coil 2 generate an energizing field of sufficient strength and that body 45 be positioned within that field.

The presence of the magnetic material 45 in the normal alternating-current field set up by energizing coil 2 deforms this field, with the result that the voltage wave induced in a pick-up coil placed in inductive relation to the energizing coil and to the magnetic material will be influenced or distorted to a degree and in a manner depending upon the magnetic, metallurgical, chemical and physical condition and other properties and characteristics of the magnetic material under test. Thus it is possible to classify certain wave forms as being representative of certain conditions or characteristics, either chemical or physical; and measurements of restricted portions of these wave forms may be made to ascertain the magnitudes of the measured characteristics.

A pick-up coil system comprising coils 5, 5a and 5b, preferably arranged concentrically to coil 2, is connected to a selector switch 6. By throwing this switch to either one of two positions, pick-up coil 5 may be connected directly to the pre-amplifier 7, or coils 5a and 5b connected in series opposition may be coupled to pre-amplifier 7 through step-up transformer 46. Usually the pre-amplifier would not be required, or at least if employed it could be adjusted to a low amplification level, in the event that pickup coil 5 is employed. The amplification provided by the pre-amplifier 7 is more likely to be required when switch 6 is thrown in the upper position, so as to employ pickup coils 5a and 5b which provide a more sensitive pickup for certain characteristics. Inasmuch as these coils are similar and connected in series opposition, the net voltage input to transformer 46 is extremely low, hence the provision of the amplifier 7. Transformer 46 should be designed to provide optimum coupling conditions between the pickup coil circuit and the input of amplifier 7.

The output of amplifier 7 is effectively connected in parallel to two portions of the remaining part of the system. First, the output of amplifier 7 is connected to the signal input terminals 47 of oscilloscope 10. This oscilloscope is, as shown, also connected to the A. C. source 1 from which it derives its operating potentials and also by which it is synchronized with the A. C. source 1, viz., the time rate of the horizontal sweep will bear a constant and definite ratio to the fundamental frequency of the signal potential applied to terminals 47 because these signals originate from the same A. C. source.

The second portion of the system connected to the output of amplifier 7 begins with tube 8 which might be termed a grid-controlled diode rectifier. A suitable tube for these purposes is known as type 6J5. It will be noted that the signal voltage wave from amplifier 7 is impressed between the anode and cathode of tube 8. The connections are such that the grid of this tube is negative with respect to the cathode and prevents current flow through the tube except for those instants when it assumes the same potential as the cathode. At these instants the tube is free to function as an ordinary rectifier. Hence by suitable control of the application of the bias on tube 8, this tube functions as a switching tube.

The bias voltage or phase control voltage which is applied to the grid of tube 8 is derived from the circuit elements in the lower portion of the diagram which together comprise a gate circuit. This bias potential is applied over connection lead 48 which is connected from the center tap 50 of the secondary winding of transformer 30 to the grid of tube 8. This bias voltage is derived from the common A. C. source which is coupled to the primary winding of transformer 37 through phase control elements comprising condenser 40 and resistor 39. By throwing phase-shift switch 38 to either one of its two positions the alternating-current potential impressed upon transformer 37 may be selected to comprise either that across resistor 39 or that across condenser 40. Thus by means of switch 38 a substantially 90° shift in phase of the potential applied to transformer 37 may be attained.

The secondary circuit of phase shift transformer 37 includes a condenser 35 and a resistor 36, both of which may be variable if desired, although satisfactory phase adjustment will frequently result from variation only of resistor 36. The center tap 49 of the secondary transformer 37 is grounded, and the common point of connection between condenser 35 and resistor 36 is connected to the grid of an amplifier tube 34. A suitable tube for this purpose would be the mentioned type 6J5. The anode of tube 34 is connected to one end of the primary winding of transformer 30, the other end of this winding being connected to a suitable source 41 of positive potential. The terminals of the secondary winding of transformer 30 are connected to the two anodes of a full-wave rectifier tube 31. A suitable tube for this purpose would be type 6H6. The cathode of rectifier tube 31 is connected to the slider of a potentiometer 32, one end of which is grounded and the other end of which is connected through a potential-dropping resistor 33 to positive potential source 41. Thus by adjustment of potentiometer 32 the bias on the cathode of tube 31 may be adjusted. The phase control or gate circuit just described permits a bias voltage to be impressed upon the grid of tube 8 of which the phase or timing with respect to the phase of the signal impressed through amplifier 7 can be adjusted, as desired, to be effective at any portion of the signal wave within a range of over 200°. The duration, or width of this bias voltage in the form of a pulse, or otherwise, may be controlled by adjustment of potentiometer 32.

The circuit between the anode and cathode of tube 8 includes series resistor 9. This resistor is, as shown, connected between the cathode of diode 11 and ground. Since the anode of diode 11 is connected through coupling resistor 12 and potentiometer 13 to ground, the signal potential built up across resistor 9 will be rectified by diode 11. A suitable tube for this purpose would be a type 6H6, it being assumed that both anodes thereof are connected together to comprise a half-wave rectifier. A suitable source 42 of direct current (here represented as a battery) is connected across potentiometer 13 and potential-dropping resistor 14 connected in series. By connecting the slider of potentiometer 13 to the anode of diode rectifier 11, the positive terminal of this potentiometer being grounded, a direct-current biasing potential may be impressed across the rectifier 11. The result of this arrangement is similar to that employed in the so-called slide-back voltmeter. In the present arrangement this adjustable biasing potential provides a zero base or threshold potential below which no signal voltage will be indicated by the meter 26.

Amplifier tube 15 is coupled to the output of diode 11 through coupling condenser 16 and grid resistor 17, and might comprise a type 6J5, for example. Thus, rectified signal voltage from rectifier 11 will be amplified by amplifier 15, and the amplified potential is coupled through step-up coupling transformer 18 to a further rectifier circuit including full-wave rectifier tube 19, cathode bias resistor 20 and by-pass condenser 21. Rectifier tube 19 may also comprise a tube of type 6H6. The output potential from rectifier 18—19 is connected to and is impressed upon the grid of triode tube 22, the anode of that tube being connected through output resistor 23 to a suitable source 41 of positive potential. A second triode 25 is connected, as shown, with its anode connected through output resistor 24 (which should be similar to resistor 23) to the same source 41 of positive potential. Tubes 23 and 24 are shown as being separate, but they may conveniently comprise a double triode, such as type 6SN7. The potentiometer 27 is connected between the grid of tube 25 and the cathode thereof so that the grid potential on that tube, and hence the current through resistor 24, may be adjusted. This potentiometer 27 is connected from ground through a potential-dropping resistor 28 to potential source 41. A suitable meter 26 which may be, for example, a milliammeter having a zero center and a range of, say, 100 milliamperes, is connected across the terminals of output resistors 23 and 24 in series, and thus will indicate in one direction or the other any difference of potential occurring across those two resistors. It will be evident that current flowing through output resistor 24 will be of a steady value which depends upon the setting of potentiometer 27, whereas the current through output resistor 23 will fluctuate in proportion to the signal potential developed across resistor 9, and consequently in proportion to the signal potential impressed upon the grid of tube 22. Thus by adjustment of the potentiometer 27, meter 26 may be balanced to zero position in the absence of impressed signal voltage fluctuations.

*Operation*

The operation of the system as above described is as follows: With no specimen of material 45 in the coil system, if the switch 43 is closed and switch 6 is thrown to the lower position connecting pickup coil 5 to pre-amplifier 7, an alternating current wave of sinusoidal form will be impressed across input terminals 47 of oscilloscope 10. This being a well-known wave form, has not been illustrated.

The sharply peaked wave form illustrated in Fig. 2 represents the pattern of the rectified full-wave potential developed between the midpoint 50 of the secondary winding of transformer 30 and ground. When a potential of this character is impressed on the grid of tube 8 through the lead 48, complete anode current cut-off results with almost any signal applied between the anode and cathode of this tube. In fact, anode current will flow only when the signal from pre-amplifier 7 is positive simultaneously with a grid bias derived at point 50 of transformer 30 which is not negative.

Assuming that material 45 to be tested is inserted in the test coil system 2, 5, 5a, 5b and that suitable energizing current is caused to flow through energizing coil 2, if pre-amplifier 7 is connected to pickup coil 5, the signal voltage induced in coil 5 due to deformation of the normal magnetic field of coil 2 might appear like Fig. 3, and would be so indicated on oscilloscope 10. Now, if a suitable biasing voltage is impressed on the grid of switch tube 8, the signal wave, or any desired portion thereof, may be indicated by meter 26, and all the undesired portions of the signal wave will be suppressed. This action is illustrated in Fig. 4 which illustrates an effective combination of the signal wave of Fig. 3 and the biasing voltage of Fig. 2 as impressed on the circuits of tube 8. From Fig. 4 it will be noted that all portions of the signal wave are effectively cut off or blocked except for the sharp peaks appearing above the horizontal axis O. Comparison of Figs. 2, 3 and 4 will demonstrate that the only portion of the signal wave of Fig. 3 which is permitted to build up an indicating voltage is the positive peak of the wave of Fig. 3. This is true because, as above mentioned, the only circumstance under which anode current flows in tube 8 is when both the signal wave and the biasing wave are positive, or at least when neither is negative. This situation is true in the illustrated example only at an instant during the positive peak of the signal wave of Fig. 3, because at this instant the biasing voltage is zero. It will be noted that there are an equal number of instants or phases when the bias voltage is zero and the peak of the signal wave (Fig. 3) is negative, but as above mentioned, under such circumstances anode current does not flow in tube 8. It is for this reason that Fig. 4 shows a positive peak (extending above the zero axis) only at 360° intervals.

By suitable adjustment of phase control switch 38 which provides a 90° phase shift, and of phase-adjusting element 35 or 36, or both, which provide a fine control over about 120°, the peaks and nodes of the bias voltage wave of Fig. 2 may effectively be moved along the zero axis with respect to the phase of the signal wave of Fig. 3. By this means any desired portion of the signal wave of Fig. 3 may be selected for inspection or measurement, viz., by deriving a positive or zero bias voltage peak from the selected positive portion of the signal wave. The resultant peak will then extend above the zero axis, as in Fig. 4, all other portions of the signal wave being suppressed.

Inasmuch as the dotted portion of the curve below the zero axis of Fig. 4 is suppressed, only the portion appearing above the zero axis is indicated or measured. Hence, the small peak or pip illustrated in Fig. 5a may be taken to be typical of the voltage wave impressed on the meter circuit, as the result of the above-described operation. If for the purposes of examination or comparison, especially if pickup coils 5a and 5b are employed, it is convenient to make such pip wider, as in Fig. 5b, this can readily be effected by adjustment of the slider of potentiometer 32 which controls the bias applied to the cathode of rectifier tube 31 and hence the cut-off of that tube.

It is desirable to indicate on the screen of oscilloscope 10 the wave form of the signal voltage of Fig. 3 simultaneously with the pip of 5a which is a measure of the magnitude of the selected portion of the signal wave. Such composite wave is illustrated in Fig. 6 which shows a complete cycle of the signal wave of Fig. 3 plus pip a which comprises the pip of Fig. 5a reversed. This happens to be a representation of the combined wave forms resulting from the specific circuit arrangement illustrated in Fig. 1, due to the fact that tube 8 here comprises a temporary shunt which lowers the voltage applied to the input terminals 47 on oscilloscope 10. However, by introduction of a suitable phase inverter circuit the input voltage to oscilloscope 10 would rise, and thus would cause the pip a to extend upwardly from the positive peak of the signal wave of Fig. 6.

Diode 11 rectifies the potential developed across resistor 9. The chief function of this rectifier is to eliminate the sinusoidal components of the signal wave, leaving residual peaks. The amplitude of these residual peaks may be adjusted by the slider on potentiometer 13. The difference in height or amplitude of the two pips shown in Fig. 5a and in Fig. 5b is the result of such adjustment. The voltage peaks as thus adjusted are approximately of the form shown in Figs. 5a and 5b, and these peaks are amplified by tube 15, the output of which is impressed upon full-wave rectifier 19 through step-up transformer 18. Since the rectified signal pulses derived from rectifier 19 are impressed upon the grid of triode 22, meter 26 will be deflected in one direction or the other from zero center, depending upon the direction of current flow through resistors 23, 24. In testing a run of material it is usually desirable to adjust the meter 26 to zero by adjustment of the slider of potentiometer 27 for signal current resulting from a desired or standard specimen so that any deflection of meter 26 will then signify a variation from the selected standard. Likewise any variation from the standard specimen of material 45 will result in a variation of the wave pattern indicated on the oscilloscope 10. Hence a change in either the meter reading or in the pattern indicated on the oscilloscope, or both, would be an indication of a deviation of the specimen of material under test with regard either to chemical composition or physical condition, or both.

In the table below are listed values of circuit elements which may be employed in practicing the invention herein described. It is to be understood, however, that these values, as well as those stated elsewhere in this specification, are given solely by way of example and not as a limitation of the invention defined in the appended claims.

Resistors

| | Ohms | | Ohms |
|---|---|---|---|
| 9 | 50 K | 27 | 1 K |
| 12 | 100 K | 28 | 40 K |
| 13 | 5 K | 29 | 100 K |
| 14 | 25 K | 32 | 5 K |
| 17 | 500 K | 33 | 40 K |
| 20 | 500 K | 36 | 10 K |
| 23, 24 | 50 K | 39 | 800 |

Condensers

| | Mfd. | | Mfd. |
|---|---|---|---|
| 16 | .05 | 35 | .5 |
| 21 | .1 | 40 | 3.0 |

What I claim is:

1. In magnetic analysis apparatus having a pickup circuit including a winding disposable in inductive relation to a magnetizable body, and means including said winding for inducing in said circuit a signal voltage characteristic of properties of said body, the improvement which comprises a grid-controlled rectifier switch tube having a cathode, a control grid, and an anode, of which said anode and cathode are coupled to said pickup circuit so that only said signal voltage is effectively impressed between said anode and cathode, means for impressing on said grid a bias potential derived from an alternating current so that the tube is rendered non-conductive except during brief corresponding intervals in successive cycles of said signal voltage and of said alternating current, and means coupled to said anode for indicating the output of the tube during said intervals.

2. In magnetic analysis apparatus having a pickup circuit including a winding disposable in inductive relation to a magnetizable body, a magnetic field for energizing said body, and means including said winding for inducing in said circuit a signal voltage characteristic of properties of said body, the improvement which comprises, a grid-controlled rectifier switch tube having a cathode, a control grid, and an anode, of which said anode and cathode are coupled to said pickup circuit so that only said signal voltage is effectively impressed between said anode and cathode, a source of substantially sinusoidal alternating current, a coil connectible to said source for generating said magnetic field, means for impressing on said grid a single bias potential derived from said alternating current so that the tube is rendered non-conductive except during brief corresponding intervals in successive cycles of said signal voltage and of said alternating current, means for shifting the phase of the alternating current from which said bias potential is derived, and means coupled to said anode for indicating the output of said tube during said intervals.

3. Apparatus according to claim 2 wherein said means for shifting the phase of the alternating current and for deriving said bias potential comprises a transformer having a primary coupled to said source and a secondary connected in a series circuit including a resistor and a condenser at least one of which is adjustable for shifting said phase, a rectifier coupled to said series circuit and connections from said rectifier to said grid and cathode, respectively.

4. Apparatus according to claim 2 wherein said means for shifting the phase of the alternating current and for deriving said bias potential comprises a resistor and a capacitor connected in series across said alternating current source, a transformer having a primary connectible selectively across said resistor or across said capacitor, and a secondary connected in a series circuit including a resistor and a condenser at least one of which is adjustable for shifting said phase, a rectifier, an amplifier connected to couple said series circuit to said rectifier, connections from said rectifier to said grid and cathode, respectively, and a source of adjustable D. C. potential connected to bias said rectifier with respect to ground.

5. In magnetic analysis apparatus having a pickup circuit including a winding disposable in inductive relation to a magnetizable body, an alternating current magnetic field for energizing said body, and means including said winding for inducing in said circuit a signal voltage characteristic of a property of said body, the improvement which comprises a rectifier switch tube having an anode, a cathode and a control grid, a switching circuit in which said anode and cathode are connected, means impressing said signal voltage on said switching circuit to form a rectified signal voltage wave therein, means for impressing on said grid a bias potential derived from the alternating current source of said field and of such phase that said tube suppresses all of said signal voltage wave except a desired portion, means for combining said signal voltage wave and said desired portion to form a composite wave, and means for indicating said composite wave.

CHARLES T. GERMANN.

REFERENCES CITED

The following references are of record in the file of this patent:

UNITED STATES PATENTS

| Number | Name | Date |
|---|---|---|
| 2,152,690 | Hana | Apr. 4, 1939 |
| 2,144,476 | Zuschlag | Jan. 17, 1939 |